United States Patent Office 3,435,599
Patented Apr. 1, 1969

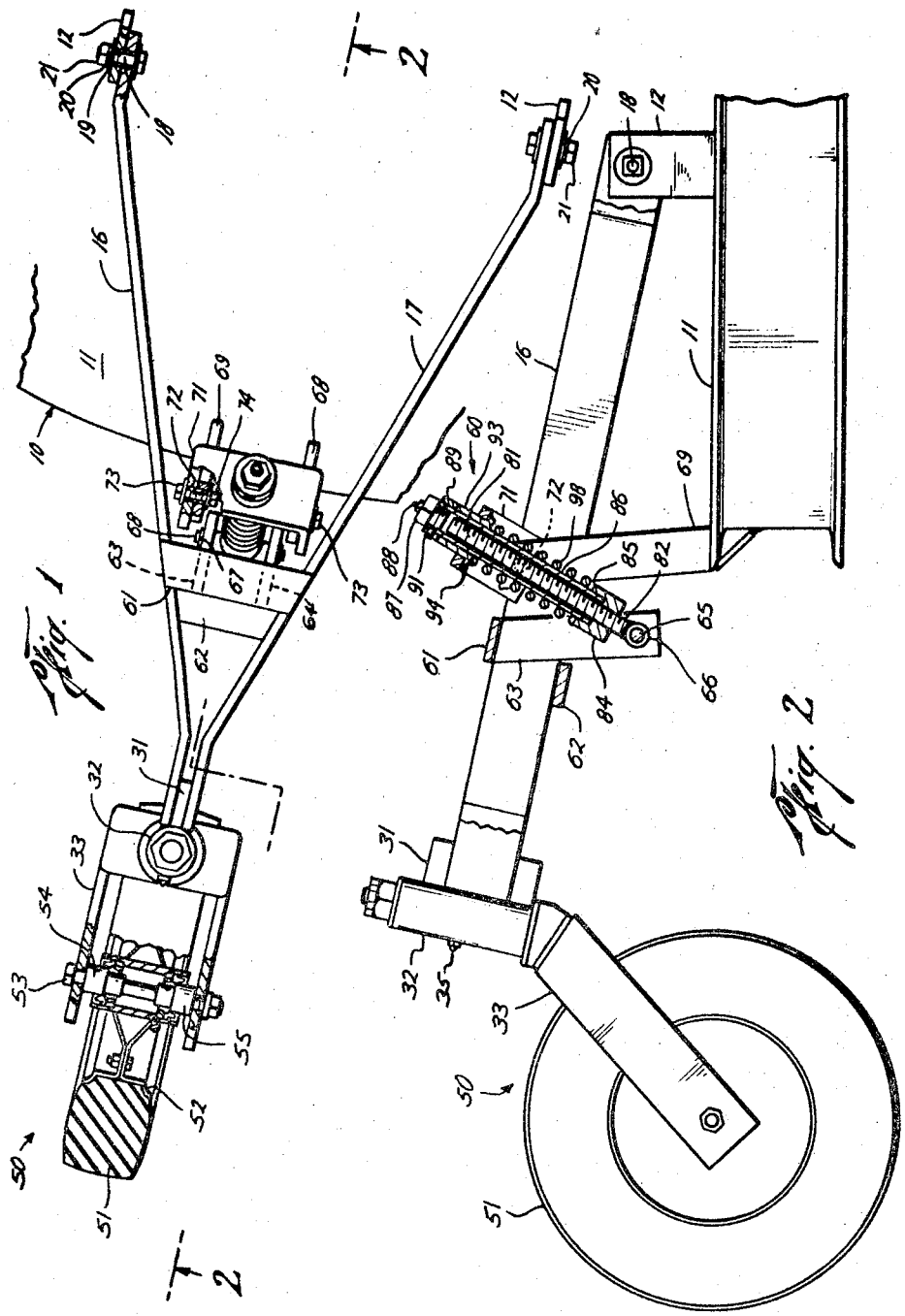

3,435,599
WHEEL MOUNT
John F. Engler, % Engler Manufacturing Corp., P.O.
Box 7616, Houston, Tex. 77007
Filed Mar. 2, 1967, Ser. No. 619,987
Int. Cl. A01d 35/26; B62d 21/14
U.S. Cl. 56—25.4                              4 Claims

ABSTRACT OF THE DISCLOSURE

A mower with a swiveled rear wheel supported on a frame pivotally attached to the mower and extending rearwardly therefrom, with a spring between the mower and the frame.

Cross-references to related applications

Ser. No. 397,680, filed Sept. 21, 1964, now Patent No. 3,334,476, and Ser. No. 66,967, filed Nov. 3, 1960, now Patent No. 3,368,828, are directed to similar subject matter as the present invention, and are related.

Background of the invention

Oftentimes tractors are utilized to pull a rotary mower therebehind. Common usage occurs in cutting growth occurring in fields, along highway right-of-way or the like. Normally the front end of the mower body is fixed relative to the tractor. The rear of the mower body may roll along and be supported by roller or wheel means. Examples of such mower and/or wheel utilization are adequately described in U.S. Patent Nos. 3,015,927 and 2,761,692, as well as in my copending application having Ser. No. 397,680.

The wheel means mentioned above are normally suspended rearwardly of the mower body and linked thereto. Such a linkage has oftentimes been a source of difficulty. Inasmuch as the wheel, and support therefor, is, in effect, swung laterally along with the mower body behind the trailer, it is commonly subject to impact. Previous wheel and support means on being swung into solid or stationary objects have oftentimes been damaged or destroyed.

Summary of the invention

The wheel mount of this invention provides means whereby impact may be absorbed to a substantial degree, thereby obviating to a large extent damage suffered by the wheel and mount. Such absorption is partially permitted by virtue of the wheel itself being pivotally joined to a support therefor. Further, support braces link the wheel and the mower body and impact-absorbing spring means are provided permitting limited vertical motion of said wheel and brace device.

Thus, this invention has as an object the provision of a more efficient mount for a wheel.

A further object is the provision of a wheel mount capable of resisting impact from a plurality of directions.

Brief description of the drawing

These and still other objects will become apparent on considering the following appended description and drawing, in which:

FIGURE 1 is a plan view, parts being broken away, of the wheel and wheel mount; and FIGURE 2 is a section taken along lines 2—2 of FIGURE 1.

Description of the preferred embodiment

Looking first at FIGURE 1, numeral 10 identifies generally, a mower body which may be drawn behind a tractor as, for example, is shown in said aforementioned U.S. patent application Ser. No. 397,680. Said mower body includes upper deck 11. Fixedly depending from said deck are oppositely disposed upstanding anchor lugs 12. Upwardly and rearwardly converging support braces 16 and 17 are pivotally linked to said anchor lugs. Said braces and lugs are conventionally linked, as for example by bolts 18, flat washer 19, lock washer 20, and nut 21.

Support braces 16 and 17 converge rearwardly and upwardly of mower body 10, and are joined at one end, as by welding for example, to plate 31. Said plate 31 is in turn joined at a slight angle from vertical to the outside of housing 32.

Tail wheel assembly 50 is rotatably mounted in yoke assembly 33, said yoke being mounted to swivel about the axis of housing 32 by virtue of a rotatable shaft affixed to the upper surface of yoke 33 and mounted for rotation within housing 32. Said housing 32 may have its upper end closed in a conventional manner. Grease fitting 35 may be provided to lubricate the internal parts of housing 32.

Tail wheel assembly 50 includes tire 51 mounted on wheel 52. Axle bolt 53 rotatably supports said wheel and tire by virtue of non-threaded axle hub 54 and oppositely disposed threaded axle hub 55. The means of rotatably supporting tail wheel assembly 50 within yoke 33 is more or less conventional in nature.

Intermediate plate 31 and upstanding lugs 12, spring mechanism 60 is disposed intermediate support braces 16 and 17. Upper and lower cross pieces 61 and 62 are secured to braces 16 and 17. Affixed to the lower surface of cross piece 61 are spaced support members 63 and 64. Said support members extended downwardly from cross piece 61 and slightly forwardly. Towards their lower ends, they are linked by axle or shaft 65, which in turn is surrounded by rotatable sleeve 66. Said shaft 65 may be secured to members 63 and 64 at its outer respective ends by lock washer and nuts such as 67, 68.

Forwardly of support members 63, 64, spring braces 68, 69 are secured at their lower ends to the rear edges of the mower body's upper deck 11. Said spring braces extend upwardly and slightly rearwardly of said mower body. Near their upper ends, members 68, 69 are pivotally linked to the downturned flaps of spring clevis 71. Said linkage is effected by virtue of pivot bushings 72 passing through apertures provided said clevis flaps and spring braces. Rotatably mounted within said bushings 72 are bolts 73 secured at their ends by nuts 74. Head 82 of threaded adjustment screw 81 is affixed to rotatable sleeve 66. The shank of screw 81 extends upwardly and forwardly through interiorly threaded collar 84, and cylindrical sleeve 86, said sleeve 86 being threadedly joined to collar 84. At the uper end of said sleeve adjustment nut 87 is made unitary therewith, as by welding, and may have a grease fitting 88 provided for internal lubrication. Surrounding the upper extremity of sleeve 86 is collar 89 which may be removably linked to said sleeve by socket set screw 91. Also encompassing sleeve 86 and slidably engageable therewith is flanged collar 93, whose flange 94 may be affixed to clevis 71. Helically surrounding sleeve 86, and limited by flange 94 and by annular shoulder 85 of collar 84 is spring 98. Thus, nut 87, collar 89, sleeve 86 and collar 84 comprise a unitary member in operation. Further, adjustment screw 81 is threadedly engageable with collar 84, said screw having its head joined with sleeve 66 positioned surrounding shaft 65. Thus, when tire 51 strikes a rough object or surface, the tire and braces 16, 17 may yield. This would normally cause support members 63, 64 to move upwardly along with said braces. Such movement would likewise cause movement of shaft 65, sleeve 66, screw 81, collar 84, sleeve 86, collar 89 and nut 87. As noted, struts or braces 68, 69 are fixed at one end to the mower body and pivotally linked at their other end to clevis 71.

Thus, such clevis is permitted only rotational movement. Inasmuch as collar 93 is linked thereto, motion of sleeve 86 is limited, much in shock absorber fashion by the force exerted by spring 98. Thus, the wheel assembly may yield in a plurality of directions to objects encountered. It also should be noted that the height of the mower body, and thereby any cutting blade associated therewith, may be regulated by adjustment screw 81. Inasmuch as said screw is threadedly engageable with collar 84, the degree of engagement will determine the angular relationship between braces 16, 17 and the mower body, said mower body generally being fixed at one end to a tractor and at the other end supported by wheel assembly 50.

Thus, it will be seen that a new and novel wheel mount has been described which may yieldingly resist damage caused by impact in substantially all directions.

I claim:

1. A wheel mount adapted to be used with a movable body, including the combination of:
   wheel means;
   means pivotally linking said wheel means to said movable body;
   means yieldingly opposing pivotal movement by said linking means relative to said movable body, said opposing means including a spring and spring blocking means, said blocking means being linked to said movable body; and
   force transmitting means disposed centrally of said spring and joined at one end to said linking means by virtue of a sleeve fixed to said one end of said force transmitting means, said sleeve rotatably joining diverse arms of said linking means.

2. A wheel mount adapted to be used with a movable body, including the combination of:
   wheel means;
   means pivotally linking said wheel means to said movable body;
   means yieldingly opposing pivotal movement by said linking means relative to said movable body, said opposing means including a spring and spring blocking means, said blocking means being a clevis linked to said movable body; and force transmitting means disposed centrally of said spring and joined to said linking means, said force transmitting means having means for varying the angle between said movable body and said linking means, said angle varying means including a threaded rod and thread engaging collar.

3. An improved wheel mount for use in conjunction with a mower, including the following:
   tire means adapted to roll along a surface;
   means permitting said tire means to pivot about an axis generally perpendicular to said surface;
   supporting means linking said tire means to said mower, said supporting means being pivotally connected to said mower;
   brace means fixed to said linking means intermediate said pivotal connection and said tire means;
   support means fixed to said mower intermediate said pivotal connection and said tire means;
   means rotatably engageable with a portion of said brace means and having a threaded exterior portion;
   collar means engaging said threaded portion;
   clevis means pivotally linked to said support means, said clevis means having an associated portion slidably engaging a sleeve which sleeve substantially encompasses said threaded portion of said brace engageable means; and
   spring means substantially encompassing said sleeve, said spring means being positioned intermediate said collar means and said portion associated with said clevis means.

4. An improved wheel mount for a mower, having a cutter blade including:
   wheel means;
   brace means pivotally connecting said wheel means to the body portion of said mower;
   said wheel means including a wheel and means for permitting said wheel to pivot about a substantially vertical axis;
   means for varying the height of said cutter blade above the ground, said latter mentioned means including, a threaded rod engaged with a threaded collar, said collar causing elevation of said cutter blade on said collar being rotated in one direction; and
   spring biased means for yieldingly varying the angular relation between said wheel brace means and said mower body as a function of the undulation of the surface encountered, said angular varying means including a spring encirclingly mounted around said threaded rod, one end of said spring bearing against said threaded collar.

References Cited

UNITED STATES PATENTS

| | | | |
|---|---|---|---|
| 2,893,019 | 7/1959 | Renfroe et al. | 280—43.2 X |
| 3,166,141 | 1/1965 | Shields et al. | 280—43.2 X |
| 3,235,286 | 2/1966 | Meadowcroft | 280—489 |
| 3,315,974 | 4/1967 | Weaver et al. | 280—43.2 |

FOREIGN PATENTS 188,308  8/1923  Great Britain.

KENNETH H. BETTS, *Primary Examiner.*

U.S. Cl. X.R.

280—80, 43.2